June 24, 1941.  F. AMIOT  2,246,494
MEANS FOR ASSEMBLING ELEMENTS BY RIVETING
Filed Jan. 31, 1939  7 Sheets-Sheet 1

INVENTOR:
FÉLIX AMIOT,
ATTORNEYS

June 24, 1941.   F. AMIOT   2,246,494
MEANS FOR ASSEMBLING ELEMENTS BY RIVETING
Filed Jan. 31, 1939    7 Sheets-Sheet 5

*Fig. 8.*

INVENTOR.
FÉLIX AMIOT,
ATTORNEYS

June 24, 1941.   F. AMIOT   2,246,494
MEANS FOR ASSEMBLING ELEMENTS BY RIVETING
Filed Jan. 31, 1939    7 Sheets-Sheet 6

INVENTOR:
FÉLIX AMIOT,
ATTORNEYS

June 24, 1941.    F. AMIOT    2,246,494
MEANS FOR ASSEMBLING ELEMENTS BY RIVETING
Filed Jan. 31, 1939    7 Sheets-Sheet 7

INVENTOR:
FÉLIX AMIOT,
ATTORNEYS

Patented June 24, 1941

2,246,494

UNITED STATES PATENT OFFICE 2,246,494

MEANS FOR ASSEMBLING ELEMENTS BY RIVETING

Félix Amiot, Neuilly-sur-Seine, France

Application January 31, 1939, Serial No. 253,928
In Luxemburg July 27, 1938

9 Claims. (Cl. 78—49)

The invention relates to means for assembling elements by riveting, particularly but not exclusively such means for riveting aeronautical construction elements, for example wings or fuselage covering elements, and has for its main object so to construct said means that they respond, better than hitherto, to the various desiderata of practice and particularly in regard to rapidity of operation.

In general, in accordance with the principal feature of the invention, means for assembling elements by riveting are so arranged that a discontinuous relative movement of the elements to be assembled takes place with respect to at least two groups of tools working simultaneously which tools effect, the first, the punching of the said elements and, the second (after the insertion of a rivet in the orifice punched by the first group of tools at the time of the preceding operation) the actual riveting of the said rivet to unite the said elements.

The invention also further comprises other features which will appear in the course of the following description.

In order that the invention may be better understood, it will now be described with reference to the accompanying drawings, which are given by way of example and in which:—

In the drawings the means for assembling elements by riveting are shown for dealing with aeronautical construction elements consisting of a sheet-metal covering 1 and stiffeners 2, and the following or a similar procedure is adopted.

The arrangement is such that the elements 1 and 2 together have discontinuous relative movements with respect to at least two groups of tools working simultaneously to effect the punching of the said elements and the actual riveting of a rivet. The latter, it should be noted, is inserted in the orifice (by hand or automatically) after the said orifice has been punched by the first group of tools at the time of a preceding operation.

Although, as above stated, the rivets may be inserted manually, it is preferable that this operation is performed automatically, for example by a rivet-supplying device A more explicitly mentioned hereafter.

Several groups of punching tools and several groups of riveting tools working simultaneously could be provided. In the following, however, it will be assumed, by way of example, that the machine which is for securing the stiffeners 2 on the metal sheet 1, comprises, on the one hand, one group of punching tools, namely a punch 3 and a die 4, and on the other hand one group of riveting tools constituted by a riveting-die 5 and hold-up 6, the rivet-supplying device A being arranged between these two groups and at a distance from each equal to the pitch of the riveting, or at a multiple of this distance.

The discontinuous relative movement of the elements to be assembled therefore is such that the line along which the riveting must be effected has, with respect to the tools, periodic relative movements equal to the pitch of the riveting, which pitch can, for example, be 20 mm. or 30 mm., or otherwise.

The relative movement can be given either by moving the elements 1 and 2 with respect to the tools, or as will be assumed hereafter, by leaving the said elements stationary and mounting the tools on a movable support 7 which permits the tools to be moved according to the line of assembly of the elements 1 and 2.

For this last purpose the elements are arranged in a substantially horizontal plane and the support 7 is given for example a C shape, its extremities being provided respectively with an upper head 7₁ and with a lower head 7₂ disposed in opposition, one above and the other below the elements 1 and 2.

The upper head 7₁ carries the punch 3 with which co-operates a sheet-clamp 3′, the rivet-supplier A and the hold-up 6, and the lower head 7₂ the die 4 and the riveting-die 5.

It should be observed that it will be advantageous to provide the same machine with several supports 7, for example four, working simultaneously in separate zones to avoid elongations and accidental displacements of the elements 1 and 2.

The machine will moreover be arranged so that the supports 7 can be brought into a zone outside that occupied by the elements 1 and 2. These latter then being disengaged from between the heads of the supports, can be moved in a direction perpendicular to that of the line of riveting and a fresh line of the sheet 1 brought to the paths to be taken by the tools. It will suffice, in these circumstances, to engage a new stiffener between the heads after having brought the supports back into working position in order to effect a fresh line of riveting.

For this purpose and with regard first of all to the machine in its entirety and especially to the devices comprised thereby for the movement and guiding of each of the supports 7, it is formed, for example, as shown in the drawings, as follows.

Each support 7 rests on two rails 8 and 9 parallel to the lines of riveting to be effected, through the intermediary of two rollers 10 for the rail 8 and one roller 11 for the rail 9.

There are provided, for guiding the support 7 and to take into account the transverse reactions, lateral rollers 12 which bear, for example, on the sides of the rail 8.

Figures 11, 12:
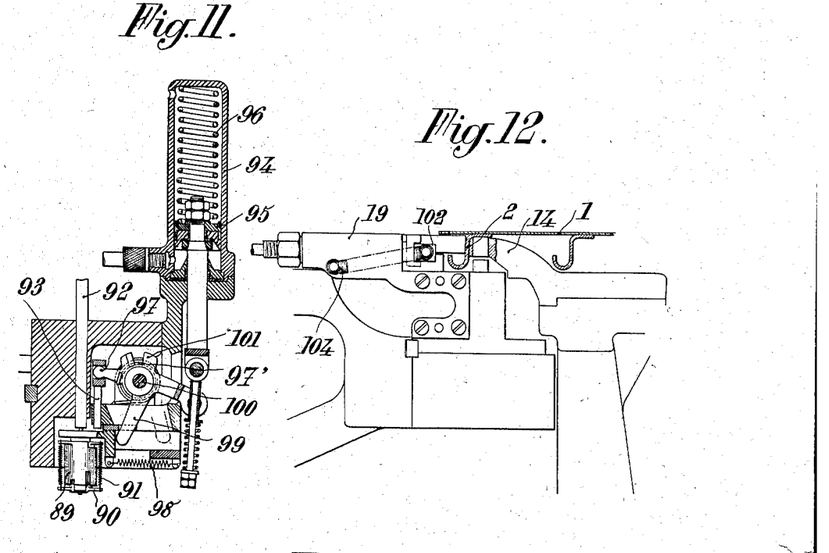
Fig. 11 is a view on the line 11—11 of Fig. 8.
Figs. 12 and 13 show, respectively in side view and in plan with parts in section, certain details of the lower head of the machine.
Figure 13:
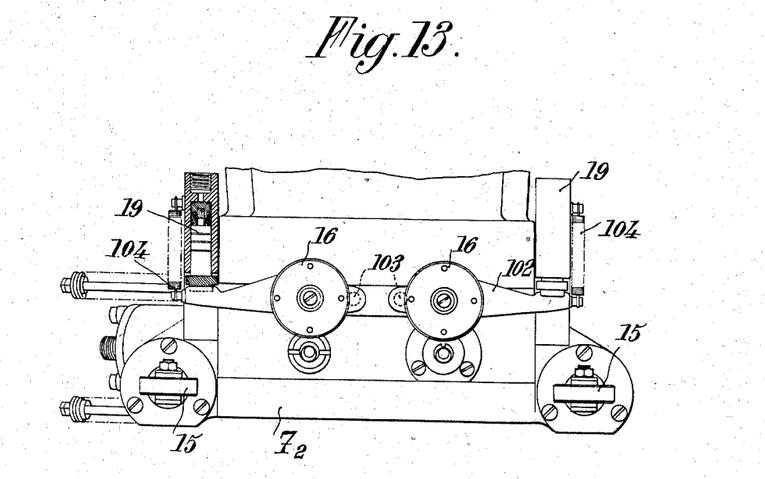

For applying the elements 1 and 2 to be assembled the one against the other there are provided rollers 13 divided for example into two groups of two mounted on beams, these rollers being carried by the upper head 7₁ of the support and applying the aforesaid elements against a part 14 (hereafter termed a comb) united with the framework of the machine and which comprises recesses for the passage of the tools carried by the lower head. There are also provided for the same purpose reaction rollers 15 carried by the lower head 7₂ and bearing against the lower face of the comb 14 and, finally, lateral rollers 16, also mounted on the lower head 7₂ and carried, as shown by Figs. 12 and 13, by beams 102 pivoted around fixed axles 103 and subjected to the action of return springs 104, the said rollers being intended to keep the stiffener 2 (in course of fixing) applied against the edge of the comb 14.

These various sets of pressing rollers (13, 15 and 16) are controlled respectively by hydraulic jacks such as 17, 18 and 19 which are under the control of a single valve so that it is possible, by opening the said valve after having suitably arranged the elements 1 and 2 to be assembled, to keep the said elements applied the one against the other during the whole of the riveting operation.

A driving system for the support 7 is provided which is arranged so that it causes the said support to advance in a discontinuous manner by amounts equal to the pitch of the riveting.

Figure 1:
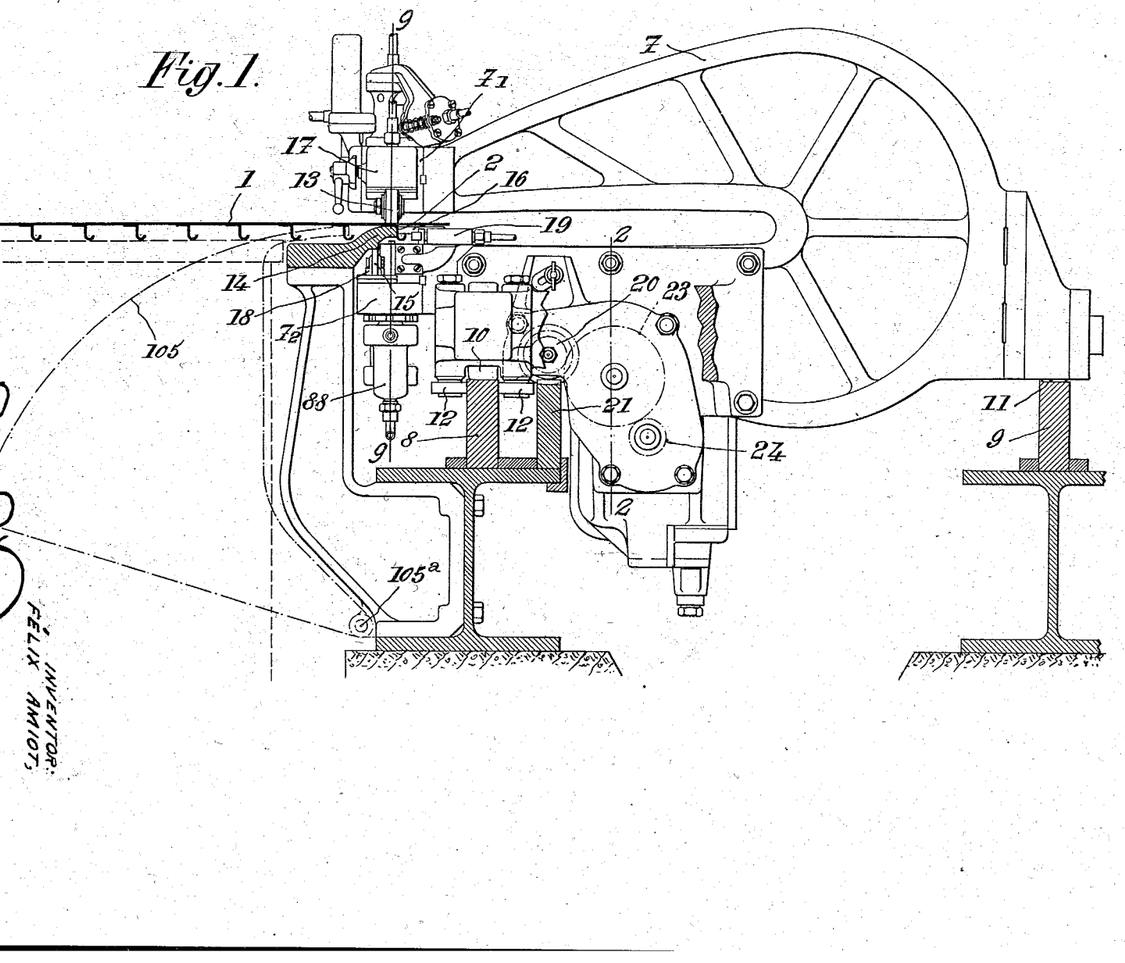
Fig. 1 shows, in end view with parts in section, a riveting machine constructed according to the invention.
Figures 2, 2A, 2B:
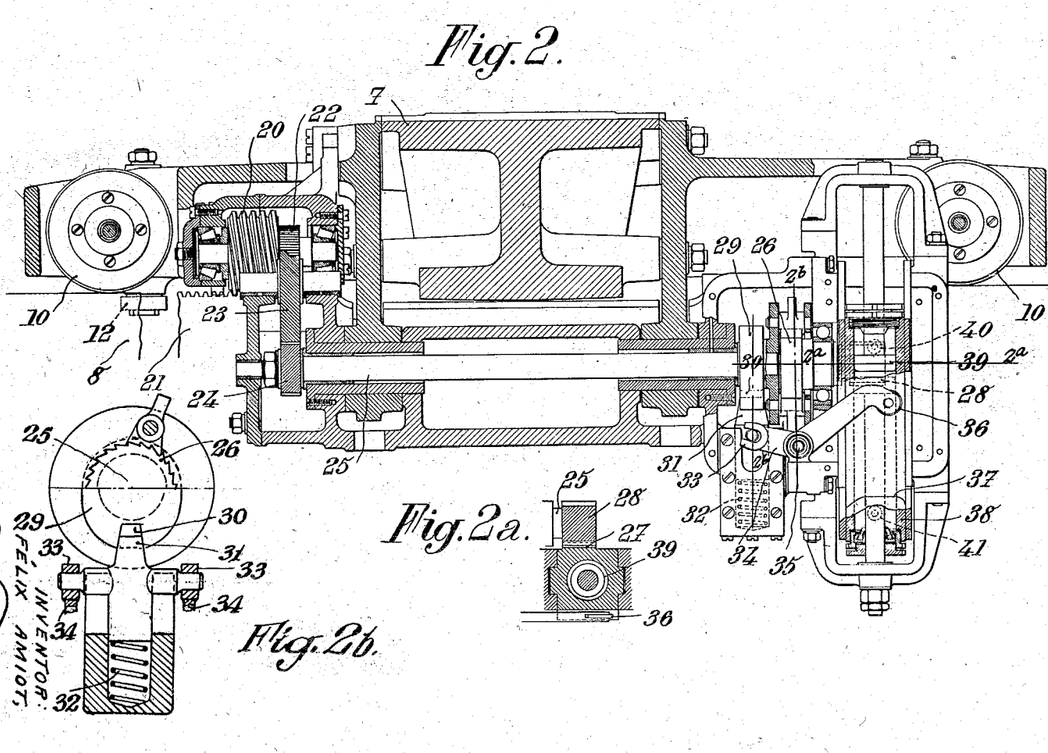
Fig. 2 is a section on the line 2—2 of Fig. 1.
Fig. 2a is a view on the line 2a—2a of Fig. 2.
Fig. 2b is a section on the line 2b—2b of Fig. 2.

Such a system is constituted, for example as represented in Fig. 2 where the support 7 carries a worm 20 to coact with a rack 21, united with the framework of the machine and arranged parallel to the rails 8 and 9. The worm 20 is driven, through the intermediary of a train of gears 22, 23, 24, by a shaft 25 adapted to be driven in one direction only, through the intermediary of a free wheel device 26, from a rack 27 gearing with a pinion 28 secured at the end of the said shaft.

The shaft 25 has keyed thereon an index plate 29 comprising a notch 30 in which can engage, at each rotation of the shaft 25, a locking finger 31 urged towards this position by a spring 32 and subjected to the action of a fork 33 carried by one extremity of a bent lever 34 pivoted around a fixed axle 35 and comprising, at its other extremity, a roller 36 with which coacts a cam 37 united with the rack 27. The said cam is such that it causes the release of the index plate 29 towards the end of the non-driving stroke of the rack 27, that is to say after a series of punching and riveting operations has been effected.

The rack 27 is controlled hydraulically, for example it is carried by a movable cylinder 38 guided by a piston 39, on both sides of which a liquid under pressure can be sent alternately by conduits 40 and 41, this hydraulic system itself being subjected to the general controlling device of the machine which will be more explicitly mentioned hereafter.

With regard to the means provided for controlling the operative movements of the tools as well as the movement of the support 7 (that is to say the movement of the rack 27), they are constituted by an electrical system for opening or closing cocks disposed on a compressed air circuit, this latter then being able, as the case may be, either to actuate the tools directly, or to act through the intermediary of a hydraulic transmission system.

Moreover, arrangements are preferably made so that on the one hand, for the hydraulically-actuated parts, both strokes are assured by the action of the liquid under pressure and, on the other hand, for the parts actuated directly by the compressed air, the forward stroke is caused by the air pressure and the return stroke assured by return springs.

It is possible, taking account of what has just been stated, to proceed in numerous ways to constitute such actuating means. A preferred embodiment, however, is illustrated by the drawings and according to which the following procedure is adopted.

Figures 3, 4, 5:
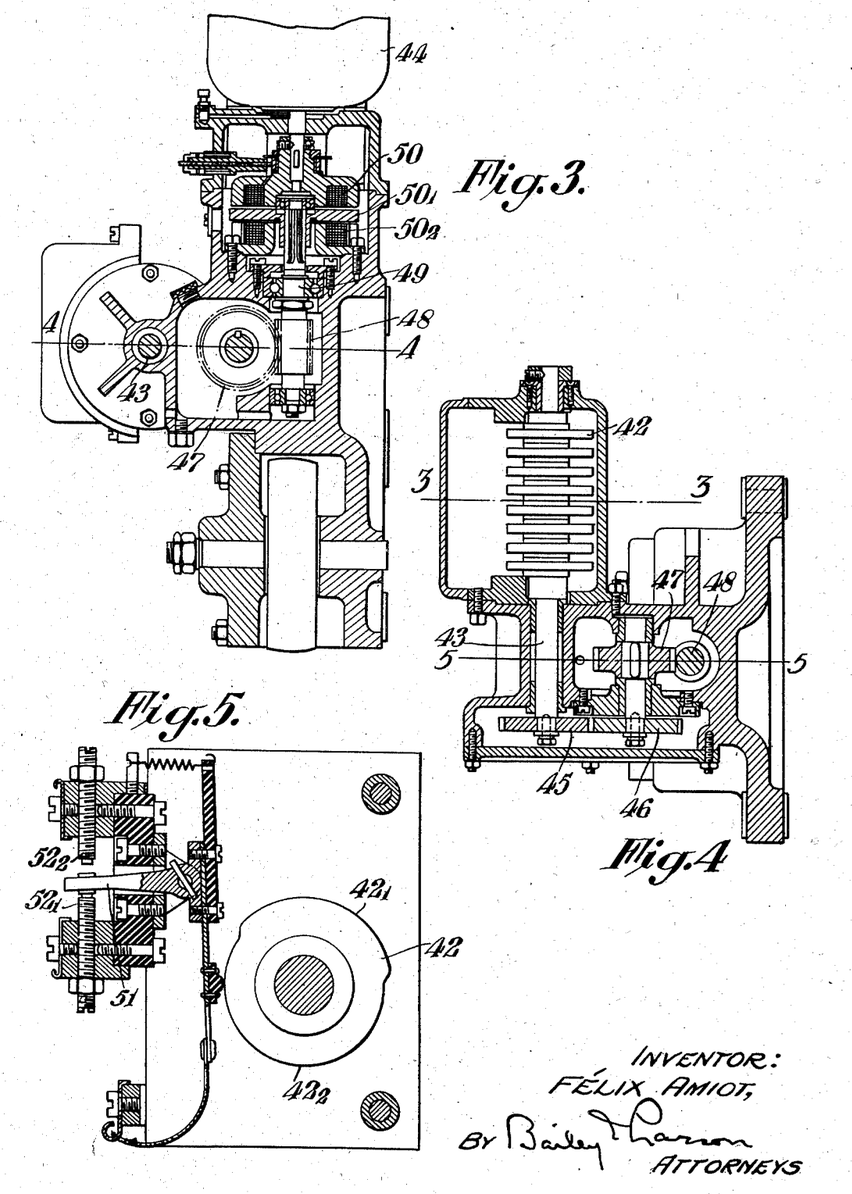
Fig. 3 is a view on the line 3—3 of Fig. 4.
Fig. 4 is a view on the line 4—4 of Fig. 3.
Fig. 5 is a view on the line 5—5 of Fig. 4.

The various electrical circuits of the machine are controlled by a plurality of cams 42 (Figs. 3 and 4) secured on the same shaft 43 driven in rotation by a motor 44, for example through the intermediary of gears 45 and 46 and of a helical pinion 47 meshing with a worm 48 secured on a shaft 49 itself connected to the aforesaid motor through an electromagnetic clutch 50 adapted to assure, in addition, if desired, the braking of the mechanism when its plate 50₁ is attracted against a stationary armature 50₂.

A commutator or the like is provided which permits of exciting the rotating armature 50 or the stationary armature 50₂ according as it is desired to effect the running or the stopping of the machine.

Each cam 42 is made to coact with an oscillating contact-maker 51 adapted to close the electric circuit on a contact 52₁ or on a contact 52₂ according as it is controlled by the upper part 42₁ or by the lower part 42₂ of the cam.

There are mounted on each of the circuits controlled respectively by the contacts 52₁ and 52₂, two electromagnets 53₁ and 53₂ (Fig. 6) which are made to coact with a cock or the like 54 connected to a source of compressed air.

In the case of parts controlled directly by compressed air (die 4, rivet-supplier A, hold-up 6) arrangements are made so that, according as it is controlled by the electromagnet 53₁ or by the electromagnet $53_2$, the cock 54 assures the placing under pressure of the driving cylinder of the part considered, or on the contrary makes the said cylinder communicate with the atmosphere, thus permitting the return springs to return the said part to its initial position.

Figure 6:
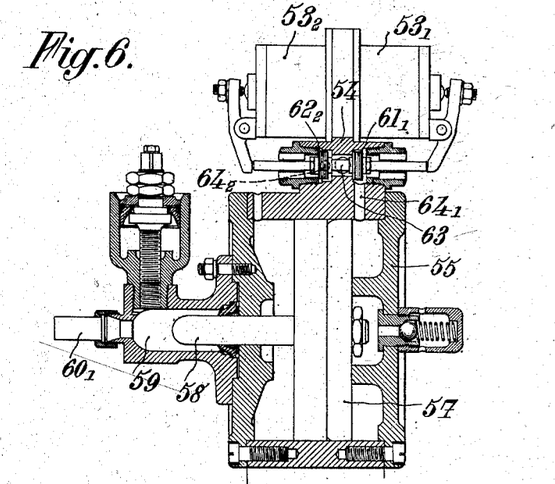
Fig. 6 is a view on the line 6—6 of diagrammatic Fig. 7.
Figures 7, 14:
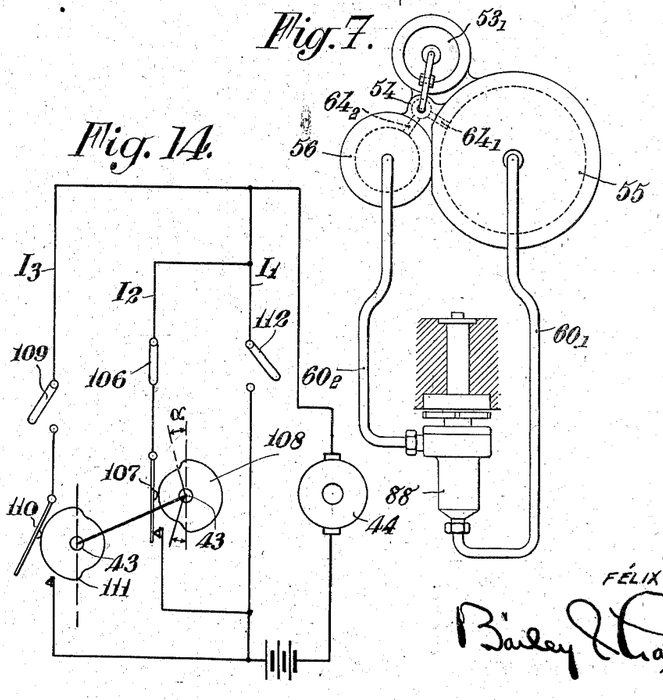
Fig. 7 shows, in a diagrammatic manner, a part of the controlling system of one of the aforesaid tools.
Fig. 14, finally, is a diagram relating to a particular controlling system for the machine.

In the case of the riveting-die 5, which must be actuated hydraulically, arrangements are made so that the two strokes of this part are caused by a pressure of liquid, for which purpose, for example, as shown by Figs. 6 and 7, there are supplied, by the same cock 54, two cylinders 55 and 56 in which move pistons such as shown at 57 for the cylinder 55. Each of these pistons is connected to a plunger such as 58 adapted to be projected to a greater or less extent into a chamber 59 containing the driving liquid, for example oil, and connected, by a conduit $60_1$ or $60_2$, to the driving system proper of the riveting-die-carrier which will be more explicitly mentioned hereafter.

The cock 54 is arranged in such a way that when it assures the placing under pressure of one of the cylinders 55 and 56, the other of the said cylinders is put into communication with the atmosphere, the said cock comprising for this purpose two disc valves $61_1$ and $62_2$ connected by a rod 63 such that, when one of the valves is removed from its seating and from this fact makes the cylinder 55 or 56 communicate with the source of compressed air by a conduit $64_1$ or $64_2$, the other valve is applied on its seating and permits that one of the aforesaid cylinders which is not in action to communicate with the atmosphere by the corresponding conduit $64_1$ or $64_2$.

Figure 8:
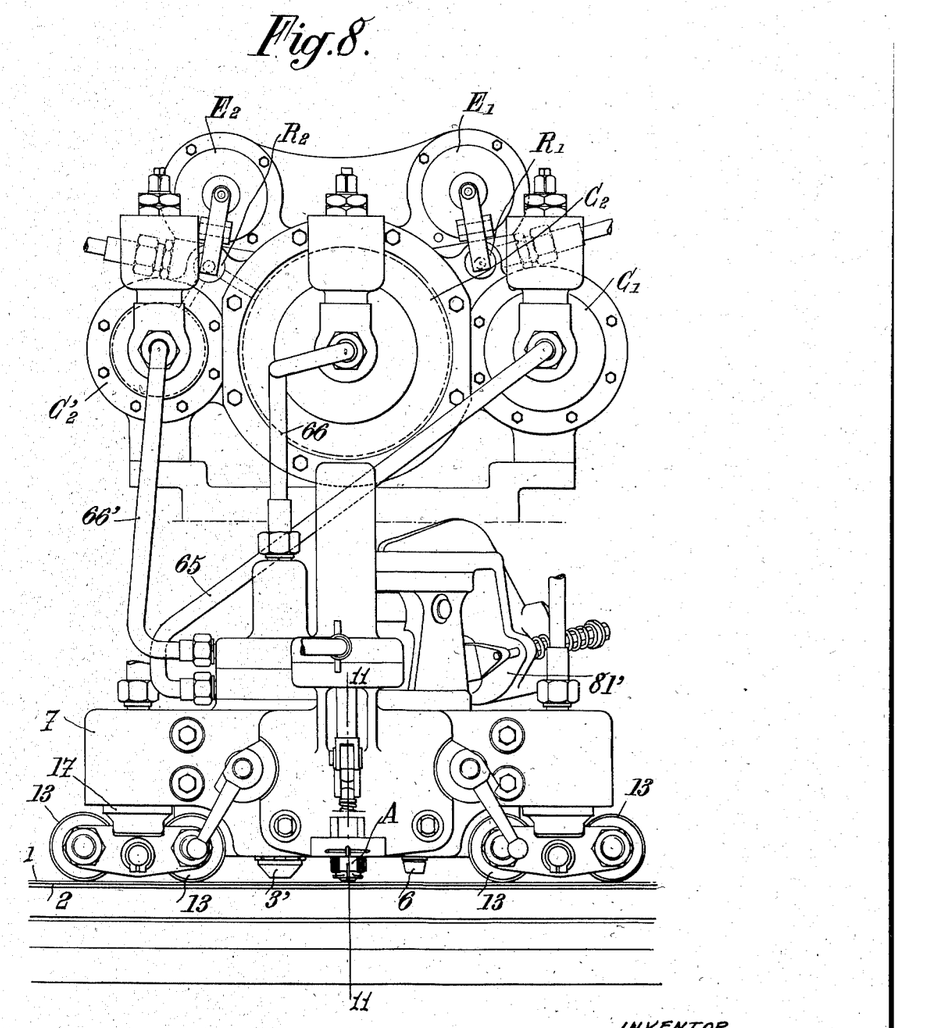
Fig. 8 shows, in outside elevation and on a larger scale, the upper head of the carriage of the machine.

In the case, finally, of the punch 3 and the sheet-clamp 3', recourse is had to controlling devices (electromagnetic cocks, compressed air cylinders) of the kind previously described but account is taken, for their arrangement, of the fact that the descent of the sheet-clamp must take place before that of the punch. For this purpose and for example as shown by Fig. 8, a double electromagnet $E_1$ coacts with a cock $R_1$ for placing under or free of pressure a compressed air cylinder $C_1$ corresponding, when it is under pressure, to the down-stroke of the sheet-clamp 3', the hydraulic circuit connected to the said cylinder terminating in the parts to be controlled by a conduit 65. Also a double electromagnet $E_2$ coacts with a cock $R_2$ supplying two compressed air cylinders $C_2$ and $C'_2$ corresponding respectively to the down-stroke of the punch and to the up-stroke of the assembly of the said punch and sheet-clamp, the hydraulic circuits connected to these cylinders terminating in the parts to be controlled respectively by conduits 66 and 66'.

Figures 9, 10:
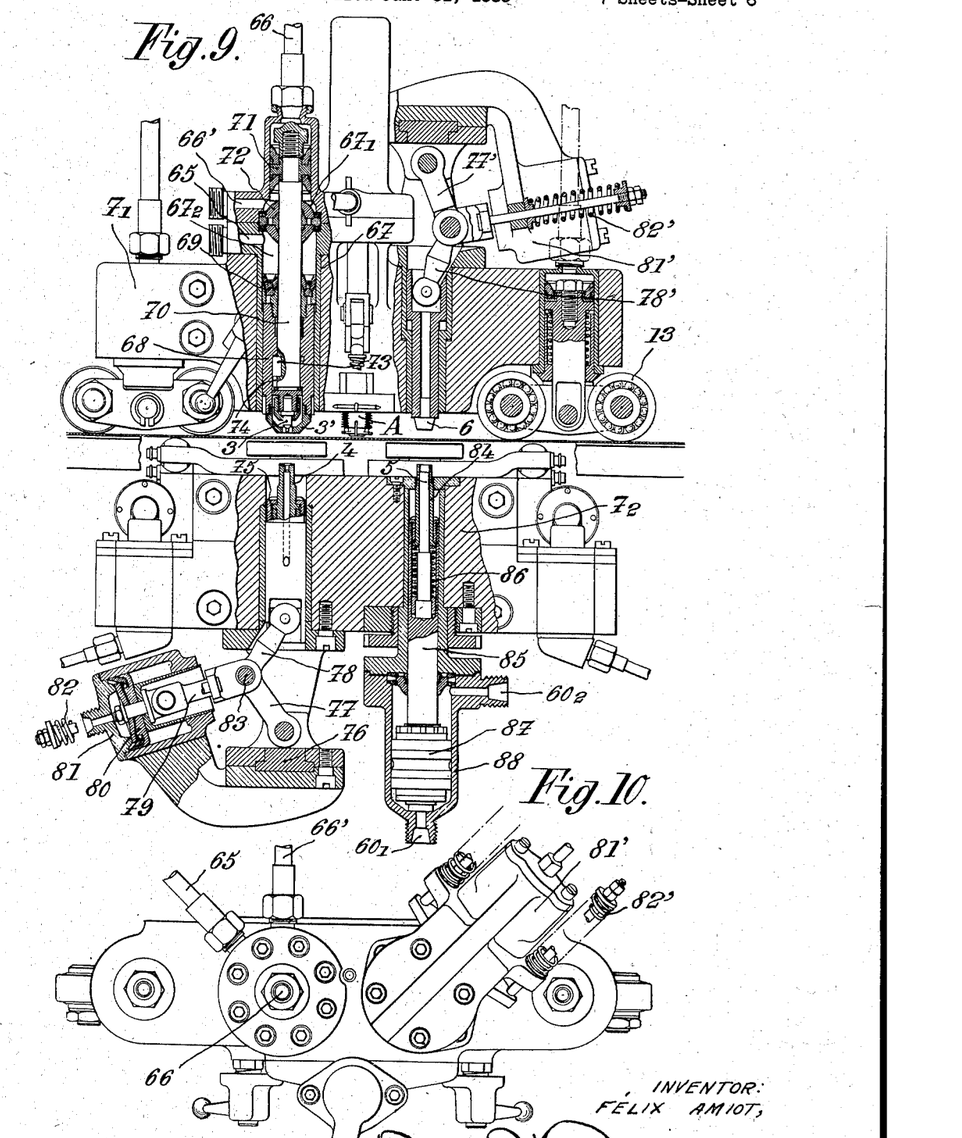
Figs. 9 and 10 show, respectively in elevation with parts in section and in plan view, the general assembly of the upper and lower heads of the aforesaid carriage.

Then with regard to the various tools as well as the mechanisms to be associated therewith so that they can be actuated as has just been stated, some hydraulically and the others pneumatically, they are with advantage constructed according to the embodiment illustrated by Fig. 9 and according to which the following procedure is adopted.

With regard first of all to the punch 3 and the sheet-clamp 3', they are mounted coaxially in a cylinder 67 carried by the upper head $7_1$, the sheet-clamp 3' being for example screwed to the lower extremity of a sleeve 68 mounted to slide in the cylinder 67 and carrying at its other extremity a single-acting piston 69, whilst the punch 3 is connected to the lower extremity of a rod 70 passing with slight friction through the sleeve 68 and the piston 69 and carrying at its upper extremity a double-acting piston 71.

A fluid-tight joint 72 is provided for separating the cylinder 67 into two chambers $67_1$ and $67_2$ in which can be accommodated respectively the pistons 69 and 71, the said fluid-tight joint being traversed along its axis by the rod 70. Opening into the upper chamber $67_1$, on each side of the piston 71, are the liquid conduits 66 and 66' the placing under pressure of which is assured by the pistons moving respectively in the cylinders $C_2$ and $C'_2$. Further, there is made to open into the lower chamber $67_2$, above the piston 69, the liquid conduit 65 relating to the cylinder $C_1$ and carried by the rod 70 is a key 73 adapted to slide, upon the commencement of the up-stroke of the punch-carrier 70, in a groove 74 disposed in the sleeve 68 and then to bear against the end of the said groove to assure the up-stroke of the aforesaid sleeve and of the sheet-clamp 3' connected thereto.

The operation of this assembly is the following:

The conduit 65 being placed under pressure by the compressed air acting in the cylinder $C_1$, the piston 69 moves down carrying with it the sleeve 68 and the sheet-clamp 3' which applies itself against the elements 1 and 2 to be assembled. As soon as this first phase is effected the conduit 66 is placed under pressure by the compressed air in the cylinder $C_2$ and the piston 71 causes the downward movement of the punch 3 and the punching of the aforesaid elements. It is then that the conduit 66' is placed under pressure by the compressed air in the cylinder $C'_2$, the piston 71 is urged towards its upper position and can rise from the fact that the conduit 66 is no longer under pressure; the punch 3 disengages itself from the elements 1 and 2 and the key 73 abuts against the end of the groove 74, assuring from this instant the upward movement of the sleeve 68 and of the sheet-clamp 3'.

With regard now to the die 4 with which the punch 3 must coact, it is carried by a part 75 mounted to slide in the lower head $7_2$ of the machine and the said part is so controlled that when it comes into working position it is supported, whereby the stresses it receives in this position are taken by the abutment of mechanical members and not by the pneumatic driving system which has brought it into the working position.

This result can be attained especially by interposing, between the part 75 and a bracket 76 united with the lower head $7_2$, two links 77 and 78 arranged in V formation with the apex pivoted to the extremity of the rod 79 of a piston 80 mounted in a cylinder 81 connected to a source of compressed air through the intermediary of an electromagnetic cock of the kind shown by Fig. 6. The rod 79 is subjected to the action of return springs 82 tending to close the V formed by the links 77 and 78, therefore to retract the die-carrier 75, whilst the action of the compressed air causes the pivoting axis 83 of the said links on the rod 79 to pass beyond the "dead centre" of the toggle-system thus formed, that is the line joining their pivoting axes respectively on the die-carrier 75 and the bracket 76.

It is understood that with such a controlling mechanism the stresses received by the die-carrier 75 will be transmitted, through the intermediary of the supported links 77 and 78, to the fixed bracket 76, the pneumatic driving system having only to be sufficiently powerful to bring the said links into the supported position against the action of the springs 82.

With regard then to the riveting-die 5, it is preferably mounted in the interior of a sheet-clamp 84 itself accommodated partly in a riveting-die-carrying part 85 and carried along by the said part through the intermediary of a spring 86. Further, the riveting-die-carrier 85 is provided with a piston 87 slidably mounted in a cylinder 88 at the extremities of which terminate the conduits $60_1$ and $60_2$ relating respectively to the cylinders 55 and 56 (Fig. 7) and assuring, the first, the raising of the riveting-die 5 and of the sheet-clamp 84 and, the second, the lowering of these two parts.

Regarding the hold-up 6 with which the riveting-die 5 must coact in order to assure the actual riveting operation, it is controlled by a system of toggle links 77', 78' similar to that described with reference to the controlling mechanism for the die the pressure of the compressed air sent into a cylinder 81' bringing the said links into the supporting position against the action of springs 82'.

With regard, now, to the rivet-supplying device A and its actuating mechanism, they are with advtange constituted according to the arrangements described in applicant's co-pending application Serial No. 253,926, filed January 31, 1939.

According to this the device A, as shown in Fig. 11, comprises an injector mechanism 89 formed by a cylinder in which can be accommodated a certain number of rivets adapted to be ejected by effecting the separation of retaining members normally kept close together by a part 90 subjected to the action of return springs 91, the aforesaid mechanism being brought alternately into alignment with a loader 92 and a hammer or the like 93.

For assuring the desired movements of the mechanism 89 and for actuating the hammer 93, a cylinder-piston assembly 94—95 is provided, the piston of which can be moved against the action of a spring 96 by compressed air delivered by an electromagnetic cock under the control of one of the cams 42 of the machine. The piston rod coacts, on the one hand, with the hammer 93 through the intermediary of a driving finger 97 returned into the upper position by a spring 97' and, on the other hand, with the mechanism 89 (which is subjected to the action of a return spring 98) through the intermediary of a movable abutment finger 99 mounted on the same axis 100 as the finger 97 and driving this latter by a nose 101 after the mechanism 89 has come into alignment below the aforesaid hammer 93.

It should be noted that a machine such as has just been described could be provided with a former 105 pivoted for example on a spindle $105^a$ and having substantially the shape of the covering prepared so that the said covering can come, by its own weight, to apply itself on the said former in proportion to the advance of the workpiece (represented by the covering).

The machine could likewise be constructed so that the assembly of curved elements could be effected according to curved generatrices. It is sufficient for this purpose to give the guiding rails of the supports the desired curvature in the plane of operation of the tools.

Although the machine described is adequate for its purposes, it is preferable to provide in addition a certain number of safety devices which will be more explicitly mentioned hereafter.

In particular, a device may be provided to obtain a "blow by blow" operation of the machine, that is to say to permit the operator to start the operation of the tools of the machine and then, by another operation, the movement of the support, and so on.

For this purpose and for example, as shown by Fig. 14, there is shunted on the circuit $I_1$ of the motor for the driving of the machine, a conductor $I_2$ on which is disposed a contact-maker 106 and an interrupter 107 subjected to the action of a cam 108 secured on the cam-carrying shaft of the machine, which cam is given such a shape that, when the machine operates in consequence of the closing of the contact-maker 106, the interrupter 107 is opened when the tools have finished working, a safety angle $\alpha$ (equal for example to 15°) being provided so that stopping takes place in any case before the mechanisms for moving the supports forward have been actuated.

With regard then to these latter mechanisms, there is provided for controlling them a shunt circuit similar to the foregoing, the said circuit being brought into action when the action of the tools is finished.

This blow-by-blow controlling system will with advantage be utilised at the time of the positioning operations of the first and last rivets.

Means may likewise be provided, such as interrupters arranged on the circuits to which the electromagnetic cocks correspond, for putting out of action the punch and the die when a line of rivets is completed, or more exactly when the rivets which have been riveted in position by the operating parts of the preceding support are encountered. This avoids, at the time of the insertion and of the riveting of the last rivets of the line, the punch becoming damaged against the head of a rivet already in position.

Finally, in order to prevent, in the case of breakdown of one of the supports 7, the following support driving it back, the extreme parts of each support may be provided with electric feelers or the like adapted to assure the stopping of the motor driving a support when the said support meets the following support or a mark intended to limit its movement.

From the above the means for assembling the elements 1 and 2 by riveting and the operation of these means according to the invention appear sufficiently clearly for it to be unnecessary to enter into any complementary explanation with regard thereto.

Such means present, among other advantages, that of being able to be operated by a limited staff, for example one attendant for each support, and that of performing rapidly the riveting operations, the rivets easily being able to be placed in position, for example at the rate of one per second.

The invention is not limited to the precise forms or details of construction described, as these may be varied to suit particular cases.

What I claim and desire to secure by Letters Patent of the United States of America is:

1. Means for assembling elements such as aeronautical construction elements by aligned riveting, comprising two groups of tools some of the tools of each group being adapted to come above the elements and the others of each group below the elements but in axial alignment with those coming above, the first group for effecting the punching of orifices in the elements, the second group for effecting the actual riveting of a rivet inserted in the orifice punched by the first group at the time of a preceding punching operation, the axis of the first group being spaced from the axis of the second group a distance determined by the pitch of the riveting, automatic means for inserting a rivet into each orifice in the elements subsequent to the punching operation and prior to the riveting, supporting means for the two groups of tools including a movable framework of C form its upper extremity having a head for the upper tools of each group and its lower extremity a head for the lower tools of each group, rollers mounted in the framework and fixed rails on which the rollers bear and are adapted to run, means for simultaneously operating both groups of tools to effect punching and riveting, fixed supporting means including a comb plate to come beneath the elements to hold the elements fixed and in position between the upper and lower tools of each group and in relation to the axial position of the tools during the punching and riveting operations, means in association with the lower part of the movable C framework carrying the tools for effecting in accordance with the riveting line a discontinuous movement between successive punching and riveting operations, this discontinuous relative movement being determined by the pitch of the riveting, and means for retaining the movable framework in each stopping position prior to the operation of the tools and for freeing the said framework from such retention after the operation of the tools, for the purposes set forth.

2. Means for assembling elements such as aeronautical construction elements by aligned riveting, comprising two groups of tools some of the tools of each group being adapted to come above the elements and the others of each group below the elements but in axial alignment with those coming above, the first group for effecting the punching of orifices in the elements, the second group for effecting the actual riveting of a rivet inserted in the orifice punched by the first group at the time of a preceding punching operation, the axis of the first group being spaced from the axis of the second group a distance determined by the pitch of the riveting, automatic means for inserting a rivet into each orifice in the elements subsequent to the punching operation and prior to the riveting, supporting means for the two groups of tools including a movable framework of C form its upper extremity having a head for the upper tools of each group and its lower extremity a head for the lower tools of each group, rollers mounted in the framework and fixed rails on which the rollers bear and are adapted to run, means for simultaneously operating both groups of tools to effect punching and riveting comprised by compressed air and hydraulic means brought into action by timed cam-controlled electrical circuits, fixed supporting means including a comb plate to come beneath the elements to hold the elements fixed and in position between the upper and lower tools of each group and in relation to the axial position of the tools during the punching and riveting operations, means in association with the lower part of the movable C framework carrying the tools for effecting in accordance with the riveting line a discontinuous movement between successive punching and riveting operations, this discontinuous relative movement being determined by the pitch of the riveting, and means for retaining the movable framework in each stopping position prior to the operation of the tools and for freeing the said framework from such retention after the operation of the tools, for the purposes set forth.

3. Means for assembling elements as claimed in claim 2 in which the hydraulically-operated tools are put into action by compressed air means, for the purposes set forth.

4. Means for assembling elements as claimed in claim 2 in which the hydraulically-operated tools are put into action by compressed air means, the structure comprising piston and cylinder assemblies for compressed air brought under or out of pressure by timed cam-controlled electrical circuits and each controlling the ram of a hydraulic cylinder and ram assembly in association with a piston and cylinder assembly controlling the tool concerned, for the purposes set forth.

5. Means for assembling elements as claimed in claim 2 in which a pair of links forming a toggle link connection is provided between a tool proper and a fixed point, the intermediate connection between the links being connected by a piston rod to a compressed air piston working in a cylinder connected to a source of compressed air, the supply of compressed air to the said cylinder being controlled by the timed cam-controlled electrical circuits, and further the structure being such that when the tool is in the operative position the compressed air action has brought the toggle link system beyond the dead centre to form a fixed mechanical support, for the purposes set forth.

6. Means for assembling elements as claimed in claim 2 in which the upper head of the C frame carries a plurality of rollers for taking upon the upper element, and in which the lower head carries rollers contacting with the underside of the comb, other rollers being provided for forcing a lower stiffener element against the comb, the whole of said rollers being connected to hydraulic piston and cylinder assemblies permitting, by the timed operation thereof through a single valve, the simultaneous gripping action of the said rollers with their co-operating surfaces prior to, during and subsequent to the operative action of the tools, for the purposes set forth.

7. Means for assembling elements as claimed in claim 2 in which the drive of the C-shaped frame is effected by a double-acting cylinder and piston assembly through a rack and pinion, free wheel and reduction gearing to a worm operatively connected with a rack parallel to a fixed rail carrying bearing rollers of the said framework, for the purposes set forth.

8. Means for assembling elements as claimed in claim 2 in which the drive of the C-shaped frame is effected by a double-acting cylinder and piston assembly through a rack and pinion, free wheel and reduction gearing to a worm operatively connected with a rack parallel to a fixed rail carrying bearing rollers of the said framework, and in which the shaft driven through the free wheel device includes an index plate co-operating with stop means to hold the said shaft in a definite position, the said stop means being controlled by a spring on the one hand and on the other hand a cam in connection with the piston and cylinder assembly, substantially as and for the purposes set forth.

9. A riveting machine having tools for preparing for and effecting the riveting, said tools having a discontinuous movement with respect to the pieces to be riveted, said machine including a cam shaft controlling the different discontinuous movements of the elements of the machine, an electric motor for driving said shaft, a principal electric circuit feeding said motor, an interrupter in said principal circuit, two shunt circuits connected to said principal circuit, two interrupters in series arranged in the first of said shunt circuits, one of the interrupters being operable at will and the other being operated by a cam driven by said motor so as to maintain the corresponding interrupter closed during the working operations of the tools, by opening the said interrupter during the advancement of the tools with respect to the pieces to be riveted, and two interrupters in series arranged in the second shunt circuit, one of the latter interrupters being equally operable at will and the other being operated by a cam driven by said motor, so as to maintain the corresponding interrupter closed during the advancing movement of the tools with respect to the pieces to be riveted and to open the latter interrupter during the operation of the tools.

FÉLIX AMIOT.